Feb. 7, 1939.   R. B. KINGMAN   2,145,934
PLANT IRRIGATING AND FEEDING DEVICE
Filed May 21, 1937   2 Sheets—Sheet 1
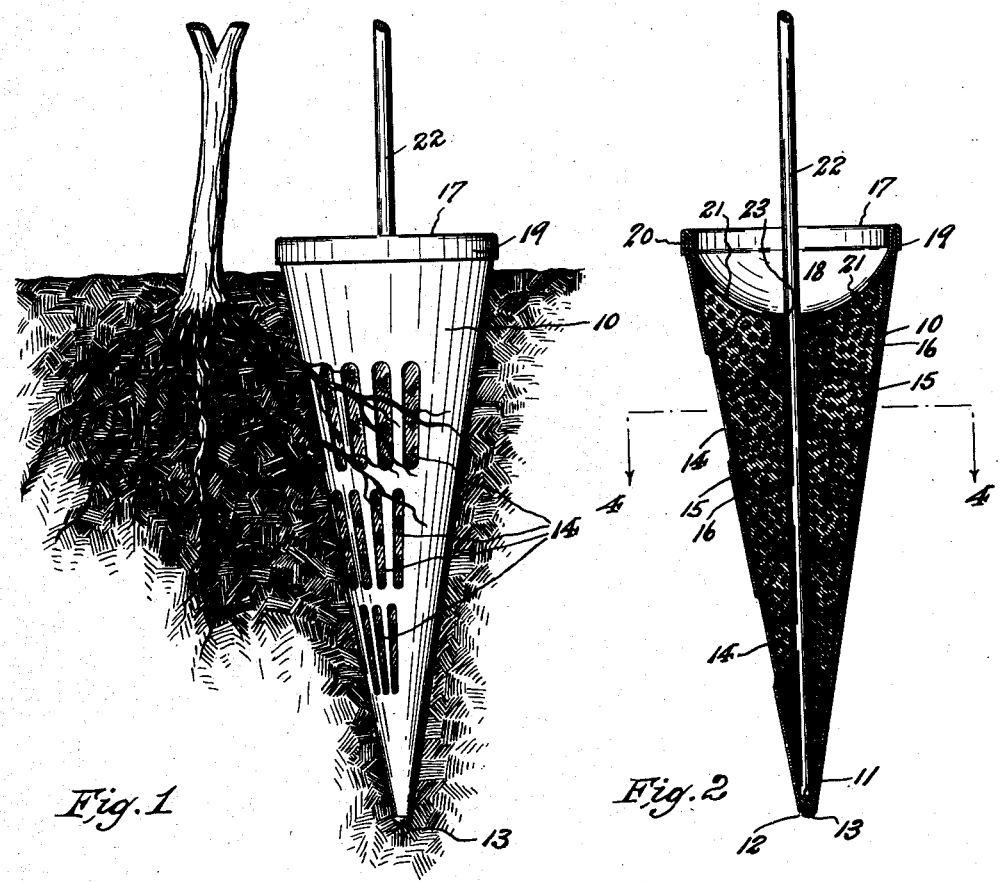
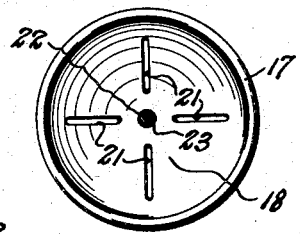
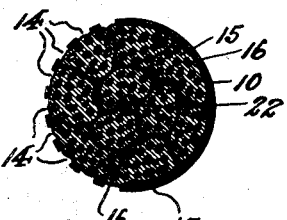
INVENTOR.
Russell B. Kingman,
BY George D. Richards
ATTORNEY.

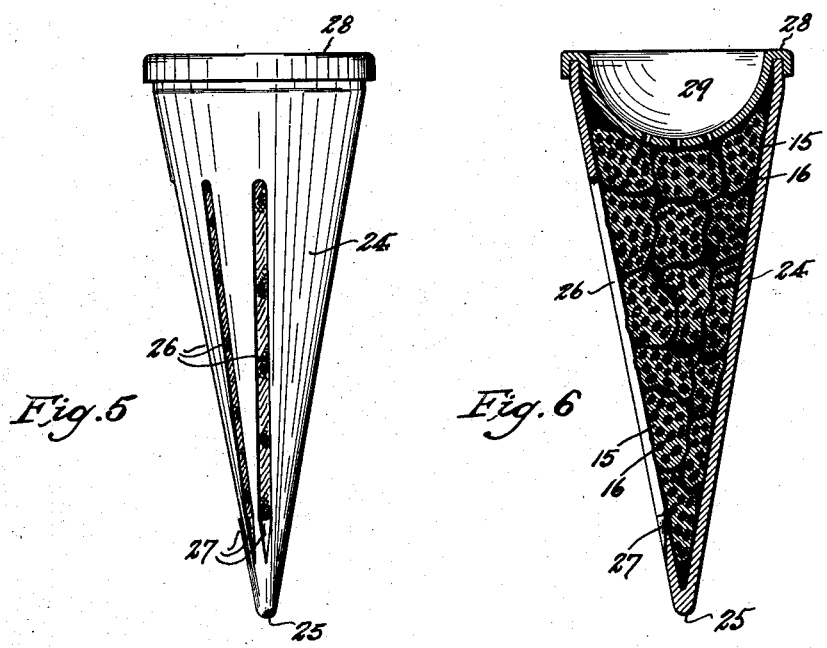
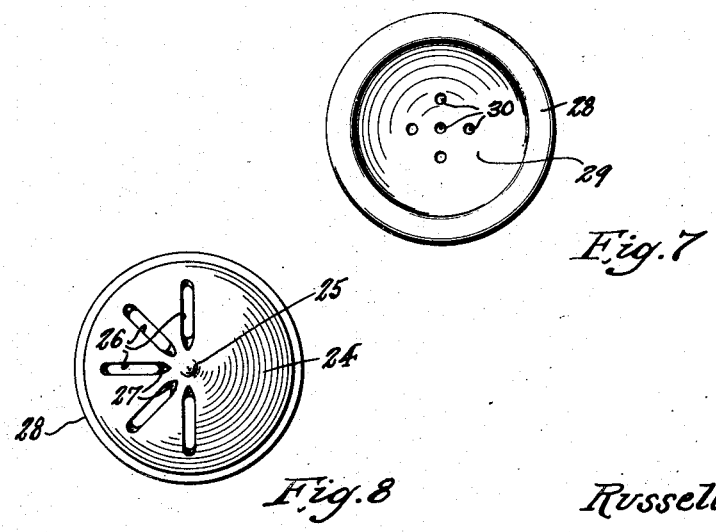

Patented Feb. 7, 1939

2,145,934

UNITED STATES PATENT OFFICE 2,145,934

PLANT IRRIGATING AND FEEDING DEVICE

Russell B. Kingman, Orange, N. J.

Application May 21, 1937, Serial No. 143,895

3 Claims. (Cl. 47—48)

This invention relates to an improved means for irrigating and feeding growing plants; and the invention has reference, more particularly, to a novel device adapted to be inserted in the soil adjacent to the roots of a growing plant; the device being provided with internal saturable means to both hold moisture and a fertilizer constituent subject to exudation to the surrounding soil and plant roots in the vicinity thereof.

This invention has for an object to provide a novel construction of device for the purposes mentioned comprising a hollow conical body having emission openings in the wall thereof, said openings facing outward preferably from one side thereof, a filling of saturable interstitial or porous material filling the interior of said body to serve as a carrier for moisture or fertilizer constituent or both, and a capping element to close the mouth of said body, said capping element comprising a cup or basin like reservoir to contain a reserve supply of water to replenish the interior filling material.

The invention has for another object to provide in operative assembled relation to the conical body an upstanding plant support member, also usable to assist in handling the device when inserting the same in the soil adjacent to a plant.

The invention also has for a further object to provide a rounded apex or terminal end for the conical body, whereby the roots of a plant are not subject to risk of injury during the operation of inserting the device into the soil adjacent to a growing plant.

Other objects of this invention, not at this time more particularly enumerated, will be understood from the following detailed description of the same.

Illustrative embodiments of the present invention are shown in the accompanying drawings, in which:—

Fig. 1 is an elevational view of one form of the novel plant irrigating and feeding device according to the invention, the same being shown as inserted in the soil adjacent to the roots of a plant desired to be served thereby.

Fig. 2 is a longitudinal vertical section through the device of Fig. 1; Fig. 3 is a top end view of the same; and Fig. 4 is a horizontal cross section thereof, taken on line 4—4 in Fig. 2.

Fig. 5 is a side elevational view of a modified form of the novel plant irrigating and feeding device; Fig. 6 is a longitudinal vertical section through the same; Fig. 7 is a top end view, and Fig. 8 is a bottom end view of the same.

Similar characters of reference are employed in the above described views, to indicate corresponding parts.

Referring to Figs 1 to 3 inclusive, the novel irrigating and feeding device as therein shown, comprises a conical body member 10 made of a suitable sheet material, such e. g. as sheet metal. When thus made of sheet material, the lower tapered extremity of the body defines a small open end 11 within which is affixed an end plug 12 the exterior end portion 13 of which is of a contour to flushly join the exterior surfaces of the body, and said exterior end portion is of rounded or semispherical conformation, thus providing a blunt extremity. The provision of such blunt extremity offers assurance against possible injury to plant roots when the body is thrust downwardly into the soil adjacent thereto. Said end plug 12 may be formed by solder dropped into the body end opening 11 so as to have an exterior portion subject to being rounded off to produce the rounded or blunt external portion. It will be understood, however, such rounded or blunt external portion may be produced in any other way found to be expedient.

The wall of said body member 10, in the region of at least one side thereof, is provided with a plurality of suitably disposed and grouped outlet openings 14. Preferably these openings 14 are of slot-like form and spaced apart in transverse rows, with the rows thereof vertically spaced along the body member. It is also preferable to have the openings or slots 14 of one row disposed in staggered relation to those of adjacent rows, although this is not essential.

The interior of the body member is filled with a mass of saturable or absorbent material 15 packed firmly therein. This packing may consist of any suitable interstitial or porous material which is capable of taking up water, and which will provide a multiplicity of voids or interstices into which can be charged a suitable fertilizer constituent, preferably of soluble character so as to be capable of combining with water for discharge or emission from the body member when the latter is in use. The packing may consist of wads of fibrous material, moss, and the like, or it may consist of pieces of natural or artificial sponge. I deem the sponge to be best adapted for the purpose, not only by reason of its ability to absorb and hold a very considerable volume of water, but also by reason of the fact that the numerous openings or voids contained therein and dispersed therethrough provide a multiplicity of storage chambers well adapted to receive and hold a suitable fertilizer constituent, the latter being indicated in the drawings by the reference character 16.

The open top end of the body member 10 is closed by a capping element 17 comprising a downwardly depressed cup-like formation adapted to form an upwardly or outwardly open reservoir basin 18. Said capping element 17 is provided around its periphery with a laterally or outwardly offset skirt flange 19 which is telescopically engageable over the free marginal portion 20 of the body member 10, whereby said capping element is engaged in operative assembled relation to the upper end of said body member. Formed in the bottom of said reservoir basin 18, to communicate with the interior of said body member 10, are openings 21 of any suitable shape.

It is sometimes desirable to associate with the body member 10 and capping element 17 a rod or stick 22 to upstand therefrom above the ground level of the soil into which the body member is inserted, whereby the upper free portion of said rod or stick 22 may be utilized as a support to which the adjacent plant served by the device may be secured and thereby sustained in desired upstanding position. To engage and support said rod or stick 22 in assembled relation to the body member and capping element, the latter is provided with a central perforation 23, through which the lower end of the rod or stick is passed to extend downwardly through the interior of the body member 10, with the lower extremity of the rod or stick 22 footed within and embraced by the tapering walls of the body member adjacent to the bottom apex thereof. By such mode of attachment the rod or stick 22 will be firmly held in desired upstanding relation to the body member 10, and secure against lateral wobbling or swaying. In addition to its functional service as a plant support, said rod or stick 22 may also be used as an aid in pushing the body member 10 into the soil at a desired place of use.

As shown in Figs. 1 to 4 inclusive, and as above described, the novel plant irrigating and feeding device may be made of sheet material, such as sheet metal. It will be obvious, however, that the device may also be made of other materials. For example, in Figs. 5 to 8 inclusive, the device is shown in a form produced by molding the same from a suitable plastic material, such for example, as a synthetic resin or phenolic condensation product. In such case, the device comprises a hollow conical body member 24 having a rounded apex or bottom terminal 25. Formed in the wall of the body member are a plurality of laterally spaced longitudinal slots 26 extending for a suitable distance intermediate the top and bottom ends of the body member. These slots 26 preferably face outwardly from one side only of the body member. The lower ends of the slots 26 terminate in downwardly extending channels 27 parallel to the vertical longitudinal axis of the body member. These channel terminals permit the drawing of the molded body member from the mold in which it is formed.

The interior of the body member 24 is also filled with the mass of saturable or absorbent material 15 packed firmly therein, and preferably comprising pieces of natural or artificial sponge, the voids of which are preferably charged with the fertilizer substance 16.

The upper open end of the body member 24 is likewise closed by a capping element 28 formed to provide the desired reservoir basin 29, from the bottom of which lead to the packed interior of the body member suitably disposed communication openings 30.

In the use of the device, the pointed lower end of the same is presented toward the soil surface adjacent to a plant desired to be served thereby, and is thereupon thrust downwardly into the soil and through the root processes of the plant, leaving however the upper end of the device, which is equipped with the capping element, projecting slightly above the ground level of the soil.

When the device is thus in place, water is poured into the same to thoroughly saturate the absorbent packing material 15. When the packing material becomes fully saturated, an excess of water will rise and stand within the reservoir basin provided in connection with the capping element, thus providing a reserve supply of water adapted to replace the moisture drawn from the device and into the soil surrounding the plant roots. As moisture is emitted from the packing material and through the wall openings of the device a quantum of the soluble fertilizer substance will be carried therewith to the plant roots, and consequently not only will the plant be irrigated in a practical manner, but fertilizer substance will be furnished without waste and only when readily accessible by the plant roots, thus assuring economical feeding of the plant as well.

From time to time the device and its reserve containing basin may be replenished with water merely by pouring the same into the reservoir basin without necessity for disturbing or removing the body member from its service position relative to the plant.

Should the fertilizer constituent become exhausted, the device may be removed from service position and repacked with fresh fertilizer charged absorbent material, or the old material may be suitably reactivated with fertilizer substance.

It will be obvious that the device may be utilized so as to function merely as an irrigator, in which case the charges of fertilizer substances may be omitted.

I am aware that various changes could be made in the above described forms of the devices, and that apparently widely different embodiments of this invention could be made without departing from the scope thereof. It is therefore intended that all matter contained in the above description or shown in the accompanying drawings shall be interpreted as illustrative and not in a limiting sense.

I claim:—

1. A device for the purposes described, comprising a hollow conical body member having emission openings in its side wall, a packing of absorbent material filling the interior of said body member, a capping element to close the upper open end of said body member, and a supporting rod extending axially upward from said body member to project through and from said capping element, the inner extremity of said supporting rod being embraced by the tapering walls of said body member adjacent to the bottom apex of the latter.

2. A device for the purposes described, comprising a hollow conical body member having laterally spaced emission openings confined within the area of approximately one-half of the circumferential extent of its wall, a packing of absorbent spongy material filling the interior of said body and charged with a fertilizer constituent, and a capping element to close the upper open end of said body member, said capping element being of a shape to provide an upwardly open reservoir basin the bottom wall of which is provided with perforations for communication between the interior of said basin and the interior of said body member.

3. A device for the purposes described, comprising a hollow conical body member having emission openings in its side wall, a packing of absorbent spongy material filling the interior of said body and charged with a fertilizer constituent, and a capping element to close the upper open end of said body member, said capping element being of a shape to provide an upwardly open reservoir basin the bottom wall of which is provided with means of communication between the interior of said basin and the interior of said body member, and a supporting rod extending axially upward from said body member to project through and from said capping element, the inner extremity of said supporting rod being embraced by the tapering walls of said body member adjacent to the bottom apex of the latter.

RUSSELL B. KINGMAN.